United States Patent [19]

Shorter et al.

[11] Patent Number: 5,291,597
[45] Date of Patent: * Mar. 1, 1994

[54] METHOD TO PROVIDE CONCURRENT EXECUTION OF DISTRIBUTED APPLICATION PROGRAMS BY A HOST COMPUTER AND AN INTELLIGENT WORK STATION ON AN SNA NETWORK

[75] Inventors: David U. Shorter, Lewisville, Tex.; John S. Kapernick, Brewester, N.Y.

[73] Assignee: IBM Corp, Armonk, N.Y.

[*] Notice: The portion of the term of this patent subsequent to Oct. 29, 2008 has been disclaimed.

[21] Appl. No.: 747,308

[22] Filed: Aug. 19, 1991

Related U.S. Application Data

[63] Continuation of Ser. No. 761,861, Oct. 24, 1988, Pat. No. 5,062,037.

[51] Int. Cl.$^5$ .................. G06F 15/16; G06F 9/46; G06F 13/00
[52] U.S. Cl. .................. 395/650; 395/800; 364/228.2; 364/229.5; 364/240.8; 364/242.94; 364/284.4; 364/286; 364/280.6; 364/DIG. 1
[58] Field of Search .................. 395/650, 800

[56] References Cited

U.S. PATENT DOCUMENTS

| | | | |
|---|---|---|---|
| 4,400,769 | 8/1983 | Kaneda et al. | 364/200 |
| 4,694,396 | 9/1987 | Weisshoor et al. | 364/200 |
| 4,849,880 | 7/1989 | Bhaskar et al. | 364/200 |
| 4,893,307 | 1/1990 | McKay et al. | 370/94.1 |

OTHER PUBLICATIONS

IBM "Systems Journal" vol. 22, No. 44, 1983, pp. 1-89.

Primary Examiner—Parshotam S. Lall
Assistant Examiner—Ayni Mohamed
Attorney, Agent, or Firm—Richard E. Cummins; James H. Barksdale; John E. Jobe

[57] ABSTRACT

A method for processing distributed application programs in SNA type networks employing LU 6.2 protocols, including an information processing system having a host processor, a virtual machine type Operating System, and a plurality of Intelligent Work Stations (IWSs). The Operating System is provided with a Virtual Machine Pool Manager (VMPM). The function of the VMPM is to create and dynamically manage the assignment of a plurality of virtual machines in the pool to process requested individual LU 6.2 conversations, to permit the transfer of information between Parts A and B of a distributed Application, which parts are stored respectively at one IWS and the host processor. In response to a conversation request, an idle Virtual Machine (VM) in the pool is assigned by the VMPM to process one LU 6.2 conversation. At the termination of the conversation the VMPM returns the assigned VM to the pool with an idle status so that it can be assigned to process another conversation requested by the same IWS or a different IWS. An LU 6.2 "session" between Part A of a DAP executing on one IWS and Part B executing on the Host Processor, involving a plurality of sequential conversations spaced apart in time, involves only the assignment of VM resources from the pool at the host for the actual conversation time of the "session", and not the total session time. As a result, VM resources at the host can service a larger number of IWSs.

5 Claims, 7 Drawing Sheets

| | | |
|---|---|---|
| L1 | END USER | PROGRAMS FOR END USER |
| L2 | NAU SERVICES | MANAGE NETWORK<br>SESSION SERVICES<br>PRESENTATION SERVICES |
| L3 | DATA FLOW CONTROL | MAINTAIN SEND-RECEIVE<br>MODES. HIGH LEVEL<br>ERROR CORRECTING |
| L4 | TRANSMISSION CONTROL | SESSION LEVEL PACING<br>ENCRYPTION AND DECRYPTION |
| L5 | PATH CONTROL | ROUTING<br>SEGMENTING DATA UNITS<br>VIRTUAL ROUTE PACING |
| L6 | DATA LINK | ERROR CONTROL, LINK LEVEL<br>ADDRESS SEQUENCING |
| L7 | PHYSICAL | SIGNAL CHARACTERISTICS OF<br>CONNECTOR PIN ASSIGNMENTS |

FIG. 3

| |
|---|
| PROGRAM A    PART B |
| 60    VIRTUAL MACHINE POOL MANAGER |
| LU 6.2<br>PROTOCOL    BOUNDARY<br>SERVICES |
| COMMUNICATION<br>LAYER<br>SERVICES |
| LU 6.2<br>PROTOCOL    BOUNDARY<br>SERVICES |
| PROGRAM    A    PART A |

| VMNAME | TPNNAME | USERID | PCID | IDIC | CONVID |
|--------|---------|--------|------|------|--------|
| VM01 | | | | NO | |
| VM02 | | | | NO | |
| VM03 | | | | NO | |
| VM04 | | | | NO | |
| | | | | NO | |
| VMnn | | | | NO | |

METHOD TO PROVIDE CONCURRENT EXECUTION OF DISTRIBUTED APPLICATION PROGRAMS BY A HOST COMPUTER AND AN INTELLIGENT WORK STATION ON AN SNA NETWORK

CROSS-REFERRENCES TO RELATED APPLICATIONS

This is a continuation of application Ser. No. 07/261,861, filed Oct. 24, 1988 now U.S. Pat. No. 5,062,037, which is assigned to the assignee of the present invention. Ser. No. 07/261,861 is currently pending with allowed claims.

FIELD OF INVENTION

This invention relates in general to inter-program communication methods in data processing networks comprising a host system connected to a plurality of intelligent workstations and in particular to a method for providing improved communications between distributed portions of an application program.

BACKGROUND ART

The prior art discloses a variety of computer networks. The IBM System Journal, Volume 22, Number 4, 1983 includes a series of articles devoted to a review of the IBM System Network Architecture (SNA). On page 345 of that publication a network is defined as "a configuration of terminals, controllers, and processors and the links that connect them. When such a configuration supports user applications involving data processing and information exchange and conforms to the specifications of the System Network Architecture it is called an SNA network. Essentially SNA defines logical entities that are related to the physical entities in a network and specifies the rules for interactions among these logical entities.

The logical entities of an SNA network include network addressable units and the path control network that connects them. Network addressable units communicate with one another using logical connections called "sessions." The three types of Network Addressable Units (NAUS) are the Logical Unit (LU), the Physical Unit (PU), and the System Services Control Point (SSCP) which are defined as follows;

Logical Unit (LU). An LU is a port through which end users may access the SNA network. An end user uses an LU to communicate with another end user and to request services of a System Services Control Point (SSCP).

Physical Unit (PU). A PU is a component that manages the resources of a node in cooperation with an SSCP.

System Services Control Point (SSCP). This is a focal point for configuration management, problem determination and directory services for end users. SSCPs may have sessions with LUs and PUs. When such a session occurs, the LU or PU is in the domain of the SSCP. In addition to sessions with LUs and PUs, SSCPs may also communicate with each other to coordinate the initiation and the termination of sessions between Logical Units and in different domains."

From the hardware standpoint, a simple network comprises a host system having a processing unit and a plurality of remote terminals that are assigned to individual users. The remote terminals are selectively connectable to the host system through one or more communication links. These links may comprise merely a coaxial cable, a dedicated telephone line, or in some cases, a satellite communication link.

The host processing unit most always has an operating system which supports the creation of a large number of virtual machines each of which is assigned, on request, to an end user. A virtual machine processes tasks for the assigned end user, by time sharing the host processor hardware of the host system. Some hosts systems may include more than one hardware processor so that true simultaneous processing occurs at the host since a plurality of processors are running in parallel. More often, there is merely one hardware processor that "concurrently" runs data processing tasks for the virtual machines by a time sharing technique. This is transparent to the end users at the terminals.

Two general types of terminals are employed in data processing networks. The first is referred to as a "dumb terminal" in that it comprises merely a keyboard and a display device and little or no processing capability other than that required to make a connection with the host system. The second type of terminal is referred to as an Intelligent Work Station (IWS) and is provided with its own processor unit and supporting peripheral devices. The terms IWS and Personal Computer (PC) are often used interchangeably. With the ready availability of PCs having very attractive price performance characteristics, most new networks are implemented with IWS type terminals and many of the older networks are being modified with the replacement of dumb terminals with IWS type terminals.

Providing each end user on the network with its own processing capability relieves the host CPU from doing many of the data processing tasks that were previously done at the host. The nature of the tasks that are processed by the host CPU therefore has changed and more sophisticated applications such as electronic mail and electronic calendaring are now implemented on the network under the control of the host system. Both of these applications involve what is referred to as distributed application programs, in that one part of the application program is resident on the host system and another is resident on the IWS terminal.

Many of the current data processing networks are designed in accordance with the IBM SNA architecture which was first described in 1974. Since then various new functions and services have been added. As suggested earlier, SNA networks can be viewed as a plurality of nodes interconnected by data links. At each of these nodes, path control elements Bend information packets, referred to as Path Information Units (PIUs) between resource managers called Logical Units. These logical connections of the paths are called a session. A transport network for data is therefore defined by the path control elements and the data link control elements.

Nodes can be connected by a plurality of links and comprise a plurality of LUs. Various types of LUs sessions and protocols have been established within the framework of the SNA architecture. There are three general classes of sessions. The first class is unspecified by SNA. The second class involves terminals and the third involves program to program communication. For example LU 6 provides SNA defined inter-program communication protocols which avoids the limitations of terminal LU types such as LU 2 and LU 7. LU 6.2 is referred to as Advanced Program to Program Communication or APPC protocols.

Logical Units are more than message ports. LUs provide operating system services such as program to program communication involving one or more local programs. Each application program views the LUs as a local operating system and the network of loosely coupled LUs connected by sessions as a distributed operating system.

The LU allocates a plurality of resources to its programs, which are dependent on the particular hardware and its configuration. Some of the resources that are made available are remote while others are local, i.e., associated with the same LU as the application program. The sessions are considered local resources at each LU, but are shared between particular LUs.

The control function of an LU is resource allocation. Programs ask one for access to a resource. Sessions which carry messages between LUs or programs running on LUs are considered shared resources. A session is divided into a plurality of serially executed conversations.

Two LUs connected by a session have a shared responsibility in allocating sessions to application programs for use as "conversations." The application programs are therefore sometimes referred to as "transaction programs."

The successful connection between LUs occurs as a result of a common set of protocols which function first to activate a session between two LUs and second to facilitate the exchange of message data.

The SNA format and protocol reference manual designated SC30-3112, published by the IBM Corporation describes SNA by defining, for example, with programming language declarations, the format of messages that flow between network entities and the programs that generate, manipulate, translate, send and return messages.

The SNA transaction program reference manual for LU 6.2 referred to as GC30-3084, published by the IBM Corporation defines the verbs that describe the functions provided by the implementing products.

Intelligent work stations that are connected to a SNA type network and employ an LU 6.2 protocol to process an application program that is distributed between the IWS and the host system operate efficiently so long as the operating system of the IWS does not run more than one application concurrently at the terminal. However, if the IWS is operating under an operating system such as OS/2, which allows an IWS such an IBM PS/2 personal computer to run concurrent application programs which are distributed, the advantage of concurrent operation on the PS/2 is lost. The advantage is lost because at the host, the separate transactions which are run concurrently at the terminal become serialized. The serialization of the transaction occurs because the host creates only one virtual machine that is permanently associated with the user ID and the specific terminal as long as the session is active.

In order to avoid the serialization at the host, the second application being run at the terminal has to be run with a different user ID in order to have a separate virtual machine established at the host that will be dedicated solely to the second application.

The present invention is directed to a method to permit at least two distributed application programs that are being run concurrently on one Intelligent Work Station of a data processing network to be executed on separate virtual machines created by the host system to prevent both applications from becoming serialized at the host and to allow each to be run concurrently with the other on both the host and the terminal.

SUMMARY OF INVENTION

The method of the present invention is advantageously employed in an SNA type data processing network that has a host system with a virtual machine type operating system and a plurality of interconnected terminals which include multi-tasking intelligent workstations that are selectively connectable to the host through an SNA message transport layer to process distributed application programs in accordance with LU 6.2 techniques and protocols.

With the method of the present invention, the host system creates a plurality of virtual machines (Vms) that are brought to a run ready state prior to and in anticipation of being assigned any data processing task which has been defined in a distributed application program, part of which is resident on the host system and the companion part of which is resident on one of the IWS end user terminals. The pool of run ready VM machines are preferably created automatically at the time that the host system is initialized under the control of a pool manager, which is a program resident on the host system, whose primary function is to assign a VM machine from the pool to an end user terminal that is running a distributed application program. The VM is assigned only for a period of time required to complete one LU 6.2 conversation. At the end of the conversation the VM machine is returned to the pool for subsequent assignment to another user at a later time.

The pool manager establishes a data structure to assist in maintaining the inventory of the created VM machines in the pool and the status of each machine. When the host machine receives a request from the terminal to start a session involving interprogram communication between complimentary parts of a distributed application program, the pool manager assembles the necessary data that is normally required to establish the session connection. However, a virtual machine is not assigned permanently to that session as is done in the prior art systems. Instead, a virtual machine from the pool of preestablished virtual machines, is assigned in response to request by one part of the application program to initiate "a conversation." When the conversation is completed, the assigned virtual machine is returned to the pool to await a new assignment.

When an IWS type terminal is running two distributed application programs concurrently with the same host system, the new method avoids the prior art problem of serialization the execution of the two distributed programs at the host. Instead, the new method assigns one VM machine from the pool to each application, at the time that a conversation is requested.

It is therefore an object of the present invention to provide an improved method for executing distributed applications in a data processing network.

A further object of the present invention is to provide an improved method for processing distributed application programs in SNA type data processing network.

A further object of the present invention is to provide an improved method for processing distributed application programs in an SNA type network employing LU 6.2 protocols, to permit one end user to run two distributed application programs concurrently on one terminal without the separate application sessions being processed serialized by the host.

Objects and advantages other than those mentioned above will become apparent from the following description when read in connection with the drawing.

DESCRIPTION OF THE PREFERRED EMBODIMENT

Figure 1:
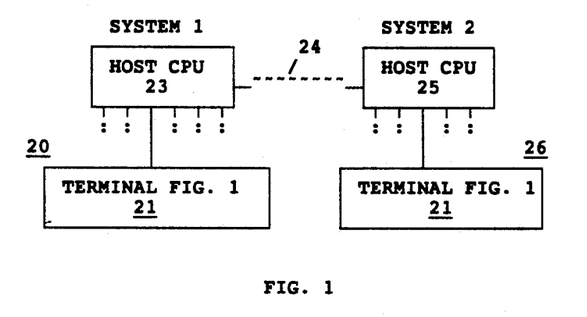
FIG. 1 is a schematic design of a data processing network.
Figure 2:
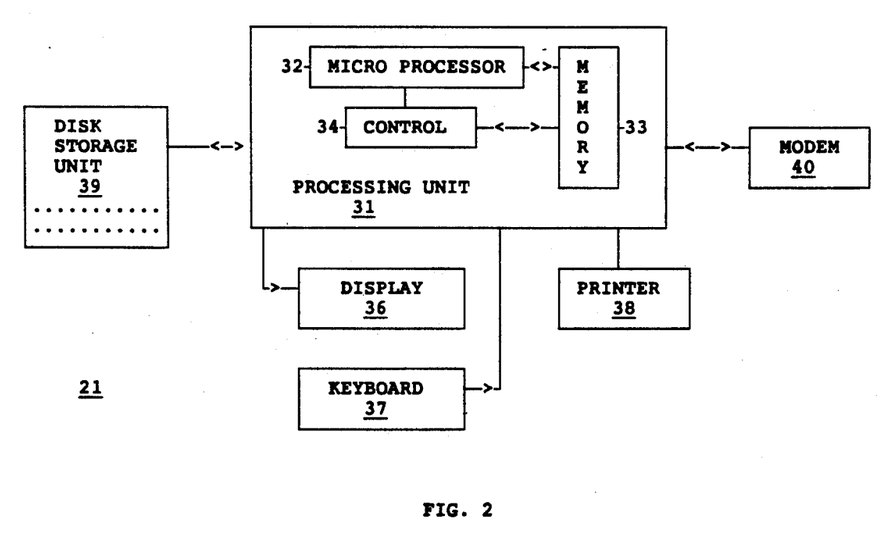
FIG. 2 is a schematic representation of one of the IWS terminals shown in FIG. 1.

FIG. 1 illustrates an information handling system comprising an SNA network 20 of interactive type terminals or Intelligent Work Stations (IWS) 21 of the type shown in detail in FIG. 2. As described, the network includes a plurality of terminals 21 which are interconnected to a host central processing system 23. As shown in FIG. 1, host 23 in turn is connected by communication link 24 to a host processing system 25, which also connects to another SNA network 26 of interactive terminals 21. Functionally, the system operates to allow each terminal or end user to communicate with the host and to one or more other terminals or users using established SNA communication protocols so that the various serially connected communication links are transparent to the users.

The host system includes a host processing unit which may by way of example be an IBM 370 system. A virtual machine type operating system, such as the IBM VM Operating Systems, is assumed in the description of the preferred embodiment.

It should be assumed that the SNA network shown in FIG. 1 supports two distributed applications referred to as "MAIL" and "CALENDAR" which are available to each terminal user. The MAIL application program allows a user at one terminal to generate a document such as a letter and Bend that letter to one or more other users at a designated nodes on the network. The sender can store the document in the host system at some logically central system location. Each addressee of the letter has the capability of retrieving that document at a later time by also using the MAIL application program from his terminal. The CALENDAR application functions to maintain an electronic calendar for each terminal user. The CALENDAR application, for example, allows one end user to view other end users' calendars prior to scheduling a meeting in order to determine free periods of those persons being invited to the meeting. Such systems are well known in the art and are currently an extensive commercial use. Since the general organization and operation of such distributed applications is well known, only those details that are necessary for an understanding of the method of processing data in distributed application programs of the present invention will be described.

It should therefore be assumed in the following description that each workstation on the network is an Intelligent Work Station such as an IBM PS 2 personal computing system employing a multi-tasking operating system such as the IBM OS/2 Operating System. It may be further assumed that conventional SNA services to support Logical Unit type LU 6.2 for distributed applications are provided by the system. The terminal shown in FIG. 1 may therefore process two distributed application programs such as MAIL and CALENDAR concurrently.

FIG. 2 illustrates the functional components of one of the interactive type data processing terminals 21, shown in FIG. 1. The terminal comprises a processing unit 31, which includes a microprocessor block 32, which is, for example, an Intel 80386 micro-processor, a semi-conductor memory 33, a control block 34 which functions to control input-output operations in addition to the interaction between the microprocessor block 32 and the memory unit 33.

The terminal further includes a group of convention peripheral units including a display device 36, keyboard 37, printer 38, a storage unit 39, and modem 40. Since the details of the above described functional blocks form no part of the present invention and can be found in the prior art, only brief functional description of each block is set forth along with the description of their interaction, sufficient to provide a person of ordinary skill in the art with the basis of understanding applicant's improved method of processing distributed application programs concurrently.

Processing unit 31 corresponds, for example, to the system unit of an IBM personal computer such as the IBM PS/2 model 80 system. Unit 31 is provided with an operating system program which may be the IBM multi-tasking OS/2 operating system which is normally employed to run the PS/2 model 80. The operating system program is stored in memory 33 along with the application programs that the user has selected to run. When the system supports a distributed application program such as MAIL or CALENDAR, only one part, e.g., part A of the distributed application program is stored at the terminal while the other part, part B, is stored at the host system. Depending on the capacity of memory 33 and the size of the application programs, portions of these programs as-needed may be transferred to memory 33 from the disk storage unit 39 which may include, for example, a 40 megabyte hard disk drive and a diskette drive. The basic function of storage unit 39 is to store programs and data that are employed by the system and which may readily be transferred to the memory unit 33 when needed. The function of the diskette drive is to provide a removable storage function of entering programs and data into the system and a vehicle for storing data in a form that is readily transportable for use on other terminals or systems.

Display 36 and keyboard 37 together provide for the interactive nature of the terminal, in that in normal operation the interpretation that the system gives to a specific keystroke by the operator depends, in substantially all situations, on what is being displayed to the operator at that point in time.

In some situations the operator, by entering commands into the system, cause the system to perform a certain function. In other situations, the system requests the entry of certain data generally by displaying a prompt type of menu/message screen. The depth of the interaction between the operator and the system varies by the type of operating system and the application program, but is a necessary characteristic of terminals on which the method of the present invention may be employed.

The terminal shown in FIG. 2 further includes a printer 38, which functions to provide hard copy output of data. Lastly, the modem 40 functions to transfer data from the terminal 21 of FIG. 2, to a host system through one or more SNA communication links.

Figure 3:
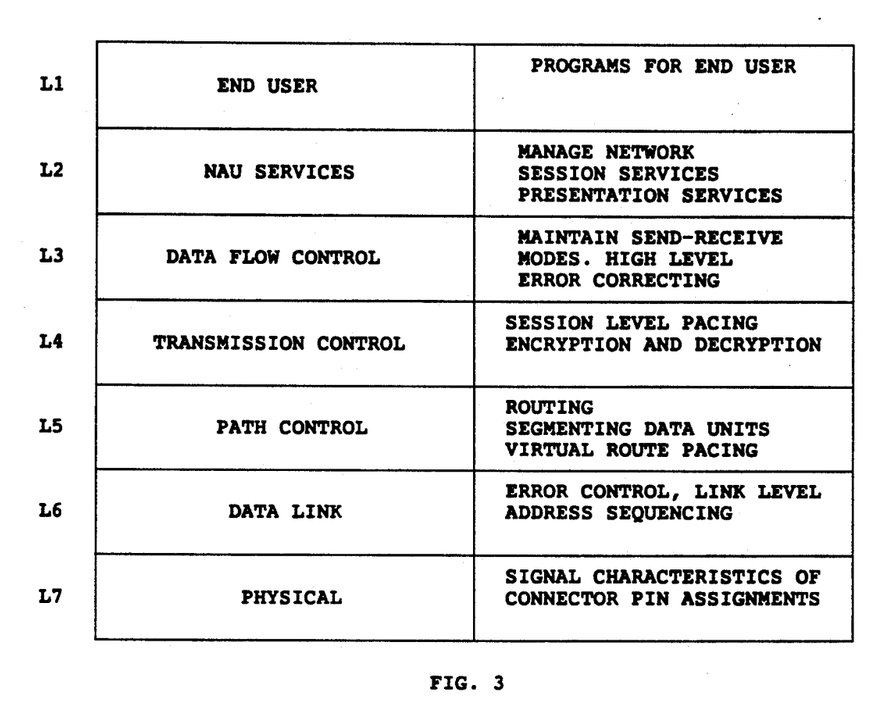
FIG. 3 illustrates the organization of the various layers of programming that are involved in the SNA network of FIG. 1.

FIG. 3 shows the various layers of programming that are employed in an SNA type network. The SNA programming environment is generally considered to consist of seven layers L1-L7 as shown. The top layer L1 as shown is the End User layer and consists of the end user programs. The second layer L2 is called the NAU Services. These services include, for example, presentation services, terminal services and formatting data for specific applications. The third layer L3 is referred to as Data Flow Control. Its function is to maintain send-/receive modes and perform high level error correction. The fourth layer L4 is the data Transmission Control layer. Its function involves such things as encryption and decryption plus session level pacing. The fifth layer L5 is the Path Control which does routing, segmenting data units and virtual route pacing. The Data Link layer L6 is the sixth layer. It functions to provide link level addressing, sequencing and error control. The seventh L7 and last layer is the Physical layer which defines for example the pin assignments on connectors for the various signals.

APPC defines the NAU services, Data Flow Control and Transmission Control. As explained on page 306 of the previously referenced IBM Systems Journal, the method of defining the LU 6.2 conversation functions, is in terms of programming-language-like statements called verbs. Documentation with verbs which are completely defined by the procedural logic that generates session flows, provides significantly greater precision than English prose. FIG. 4B shows how the verbs define the interaction between transaction programs, i.e., part A or part B of the distributed application, and Logical Units for conversation resources. A set of verbs is referred to as a protocol boundary rather than as an application program interface.

Figure 4A:
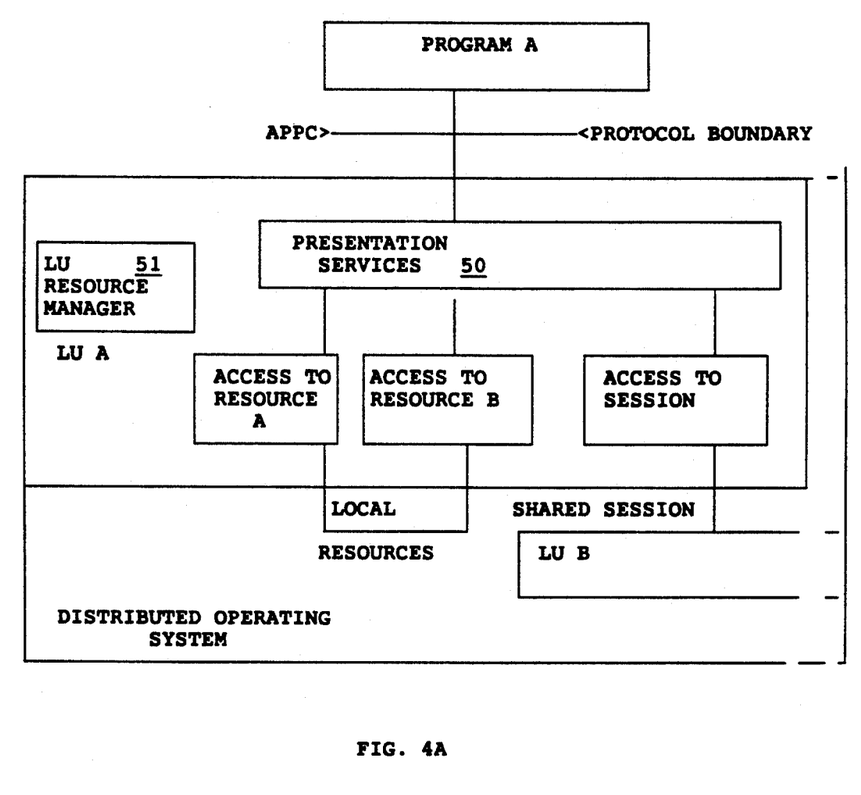
FIGS. 4A and 4B show the relationships between parts of a distributed application program and network programs.
Figure 4B:
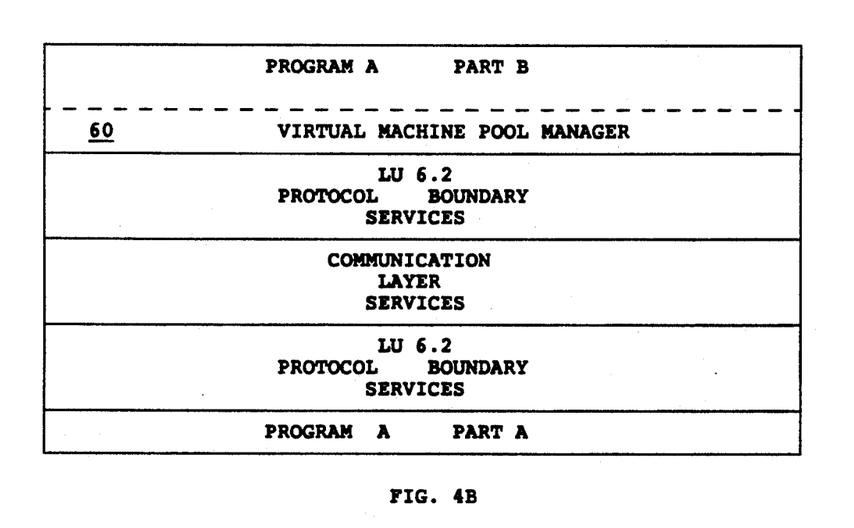

As shown in FIG. 4A, the presentation services component 50 interprets verbs and can be thought of as including a subroutine for each verb. The LU resource manager 51 does allocation of conversation resources and assignment of conversations to the sessions, keeping queues of free sessions and pending allocation requests. Its equivalent component in products also allocates local resources in products specific ways. The function of the following LU 6.2 verbs is set forth on page 307 of the previously mentioned IBM System Journal. The 6.2 verbs discussed are one, SEND_DATA, RECEIVE_AND_WAIT, PREPARE_TO_RECEIVE, FLUSH, REQUEST_TO_SEND, SEND_ERROR, CONFIRM, ALLOCATE AND DEALLOCATE.

The ALLOCATE verb initiates new activity at another LU by building a conversation to a named partner program. The named partner is placed in execution and given addrebsability to the conversation that started it. The ALLOCATE verb carries several parameters including the following.

1. LU_NAME. This is the name of the LU at which the partner program is located.
2. TPN. TPN is the Transaction Program Name of the partner program with which the conversation is desired.
3. MODE_NAME. MODE_NAME specifies the type of transportation service that the conversation is to provide. For example, a SECURE, a BULK, or a LOW_DELAY conversation can be requested. The LU uses a session with the appropriate MODE_NAME to carry the conversation.

The target of the conversation is a newly created process or task, which means that the distributed processing in the network at any instant of time consists of a number of independent distributed transactions, each of which consists of two or more transaction programs connected by a conversation. The DEALLOCATE verb ends the conversation. In as much as each partner may issue DEALLOCATE, a conversation varies from a single short message to many exchanges of long or short messages. A conversation could continue indefinitely, terminated only be a failure of a Logical Unit or by the session that carries it. Transaction programs are not ended by DEALLOCATE, but continue until they terminate their own execution, end abnormally or are terminated by control operator action.

Both network application programs and service transaction programs use the execution services provided by Logical Units. Service transaction programs run on Logical Units in the same way as other transaction programs. They interact with the human operator or they may run as a pure programmed operator. Many service transaction programs effect only the local Logical Unit. An example is a command to display the current set of active transaction programs.

Other control transactions, especially those that relate to sessions, can effect other Logical Units as well as applications at other Logical Units. For example, a local command to prematurely terminate a transaction that is using a conversation causes the conversation to be ended abnormally, a state change that must be transmitted to the partner Logical Unit for presentation to the transaction program that is sharing the conversation. Or a decision to activate one or more of the sessions shared by the two LUs may be made by one LU operator but must be communicated to the other Logical Unit. Advanced Program to Program Communication (APPC) for SNA includes several control operator verbs that provide LU to LU control and coordination, especially for activation and deactivation of sessions. When a distributed service transaction program starts at one LU, it creates a conversation to a partner transaction program in a partner LU. The two transaction programs then cooperate to preform the desired control activity.

The IBM VM host operating system includes a component referred to as APPC/VTAM Services (AVS) which is responsible for the APPC protocol boundary support in the operating System. AVS defines one or more LU 6.2 Logical Units to IBM Virtual Telecommunications Access Method (VTAM). VTAM is the IBM host computer component that manages the communications layer between the host and the various terminals of the network. AVS acts as a bridge for APPC communications to virtual machines within the operating system. For example, when an APPC ALLOCATE verb is received that originated from outside the VM operating system, VTAM will determine if there is a Logical Unit active that corresponds to the LU name specified in the ALLOCATE. AVS will have previously told VTAM that it will handle all traffic for particular LU names. VTAM will find that AVS has defined an LU that corresponds to the LU name in the ALLOCATE verb and pass the ALLOCATE verb to AVS.

There is additional information supplied with the ALLOCATE verb that is used in this process. Included in the ALLOCATE is a User ID, the identification of the user that the allocate was submitted in behalf of, and a Transaction Program Name (TPN). The TPN is the application program to be invoked, that is the part B of the distributed application such as MAIL. At the time AVS receives the ALLOCATE, it will create a virtual machine and pass the transaction program named in ALLOCATE to an operating system component that is resident in the virtual machine. The operating system component in the virtual machine will activate the named application and interaction can occur between the part A and part B of the application.

FIG. 4B is similar to the representation of the SNA programming environment shown in FIG. 3 and represents the SNA/APPC programming environment in which the method of the present invention is advantageously employed.

The IWS is provided with a programming organization which allows the terminal to run two application programs concurrently. An article entitled "Multiple Tasks" beginning on page 90 of Volume 5, Number 11, of the PC Tech Journal, published November, 1987 explains in detail the IBM OS/2 multi-tasking capabilities.

In the previous example, when the same terminal initiates a second distributed application program, it will be assigned the same virtual machine that has been created for the first distributed application program. As a result, the two application programs running on the host virtual machine become serialized, which defeats the overall purpose of providing an operating system at the terminal that is capable of multi-tasking operations.

Figure 5:
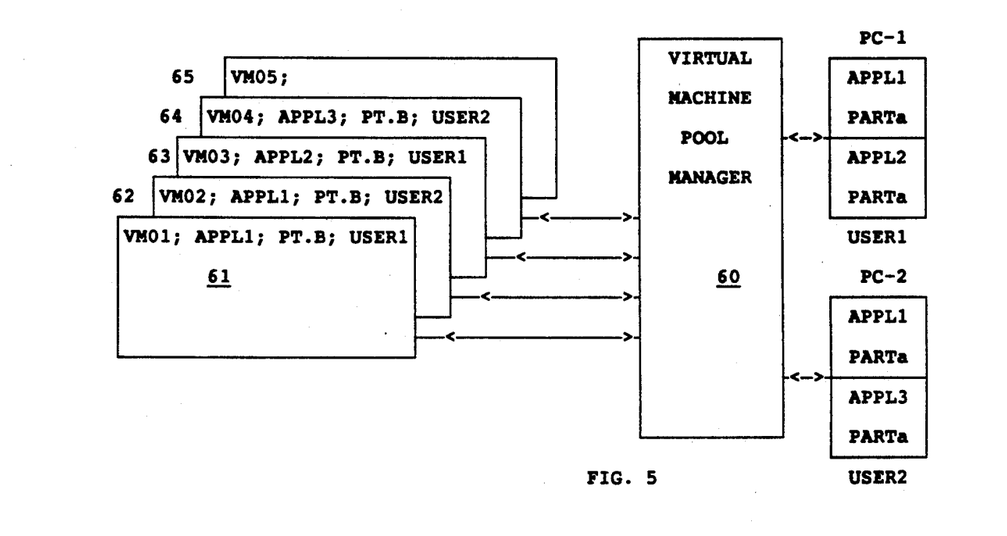
FIG. 5 is a schematic representation of the pool of run ready virtual machines that are created by the method of the present invention.

In accordance with the method of the present invention, an additional function referred to as a VM Pool Manager 60 (VMPM), shown schematically in FIG. 4B has been added to the Protocol Boundary services of the prior art. The VMPM operates in the same virtual machine as does the Protocol Boundary services, which in the IBM VM operating system is called the AVS module. When activated, the VMPM will read a set of installation supplied parameters and create a plurality of virtual machines 61-65, as shown in FIG. 5, that are brought to the run ready state. Included in these parameters are generic names of the virtual machines to be created in the pool. The names or virtual machines IDs will previously have been defined in the Operating System's directory of virtual machines. The VMPM 60 issues an Autolog macro for each of the machines 61-65. The Autolog macro is a known function in the VM operating system. When issued for a particular virtual machine, it will result in that machine being created and placed in a state such that it is waiting for work, in this case waiting for an APPC /ALLOCATE verb to be passed from AVS.

Figure 6:
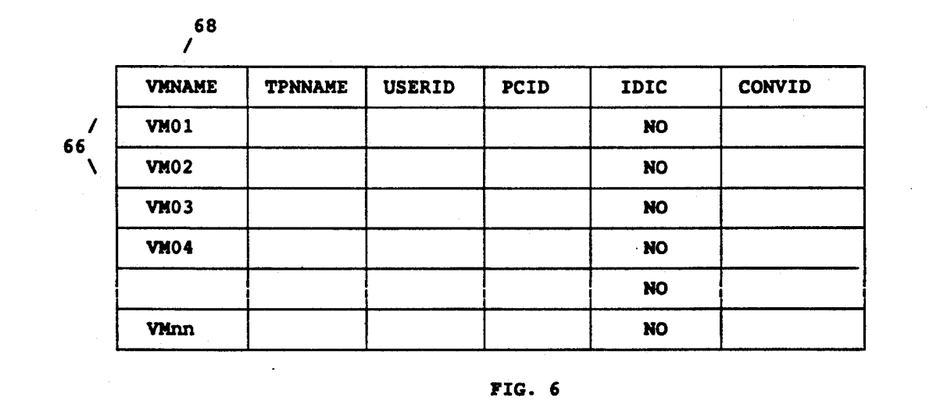
FIG. 6 illustrates the details of the Virtual Machine Pool Data Structure that is employed the by the Pool Manager in managing the pool of virtual machines shown in FIG. 5.

As each machine 61 65 is successively created by the Autolog macro, the VMPM will create an entry in a VMPM data structure 68 shown in FIG. 6 representing that virtual machine and its state, in control blocks 66 that are owned by the VMPM. When all virtual machines in the list have been created, the VMPM will return control to the AVS. After the virtual machines have been created and the pool manager has returned control to the AVS, the following scenario occurs.

The terminal operator interactively enters information into his terminal to invoke the distributed application program Mail. As a result of that, the "All" part of the Mail distributed application issues the ALLOCATE verb including the following parameters LU name =LU 1,
TPN =MAIL,
USERID =DICKC.

When VTAM receives the ALLOCATE verb, it sees that an LU named LU1 was defined by AVS and it passes the allocate to AVS. AVS sees that LU1 is associated with the pool manager by scanning the pool manager data structure. It therefore activates the pool manager component of AVS and passes the ALLOCATE information to it. The second function of the pool manager is to scan its control block entries that represent virtual machines in the VM pool and look for one that is available for work. When it finds an available virtual machine, it changes the ALLOCATE parameters to the following:

LU NAME =VMO1,
TPN =MAIL,
USERID =DICKC.

The pool manager changes the LU name to the name of the virtual machine in the pool. The pool manager also updates the control block entry that represents the virtual machine to show that it is no longer available. The pool manager then places information into the control block entry that reflects what the virtual machine is busy doing. The pool manager then re-issues the ALLOCATE verb with the changed LU name.

The VM operating system will then pass the ALLOCATE to the operating system code resident in the selected virtual machine. That code then activates the application part B named in MAIL and switches the ID of the virtual machine to the ID specified in the allocate verb which, in this case, was DICKC. A conversation is then conducted between part A and part B of the MAIL distributed application program. Similar interactions of the type described above can occur concurrently from a single multi-tasking PC or from multiple PCs. When the part A and part B complete their interaction, either may issue an APPC DEALLOCATE verb to end the conversation. When a DEALLOCATE verb is received, AVS will invoke the pool manager and it will change the control block entry that represents the virtual machine that was involved. The pool manager will change the status of the virtual machine to an available state.

It will be seen that in accordance with the above process, a single conversation defined by an ALLOCATE and a DEALLOCATE is handled by an assigned virtual machine from the pool of virtual machines under the control of the pool manager. The next conversation would undoubtedly be assigned to a different virtual machine from the pool. As a result, two distributed application programs that are being run concurrently from a single terminal with a single user ID are assigned by the VMPM, in accordance with the new method, to different VM machines that were created earlier by the virtual machine pool manager. This avoids the problem that exists in prior art systems and methods where two distributed application programs originating from the same terminal with the same user ID become serialized within one virtual machine at the host system.

Figure 7:
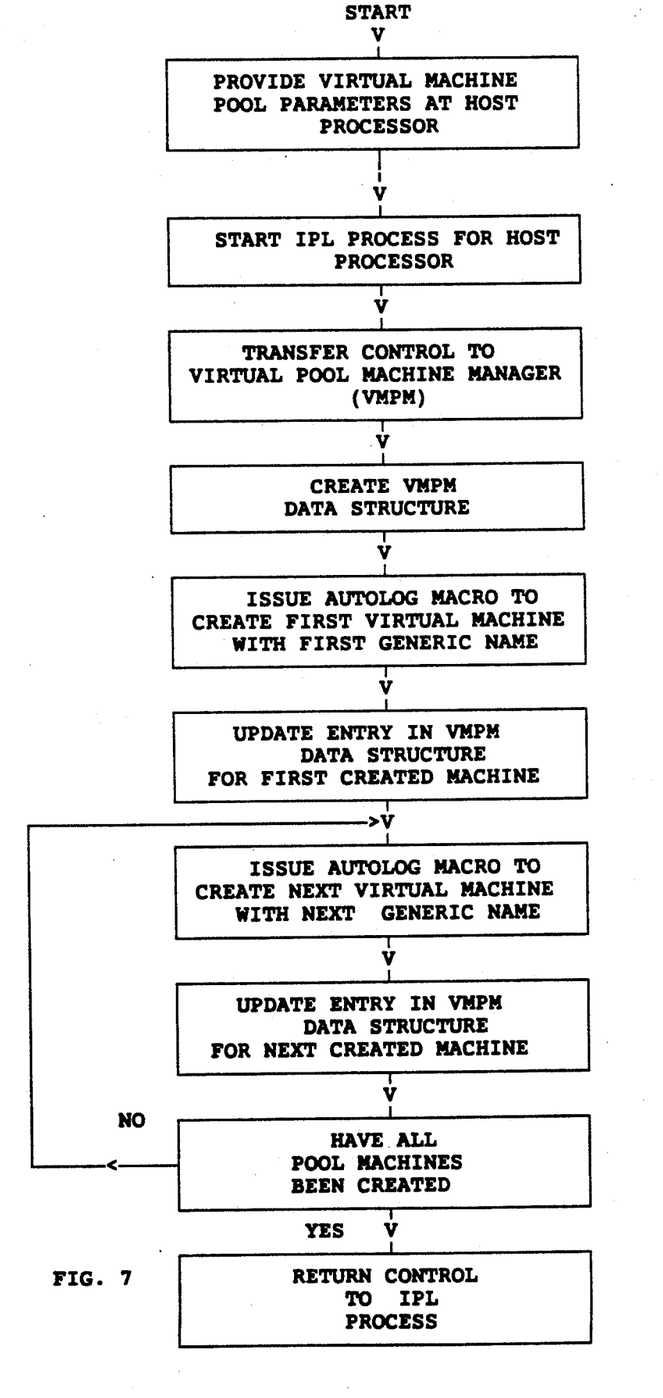
FIG. 7 is a flow chart setting forth the steps involved in creating the pool of virtual machines shown in FIG. 5.

FIG. 7 sets forth a flow chart of the steps involved in creating the virtual machine when the host system is initially IPLed. The flow chart of FIG. 7 summarizes the steps discussed above.

Figure 8A:
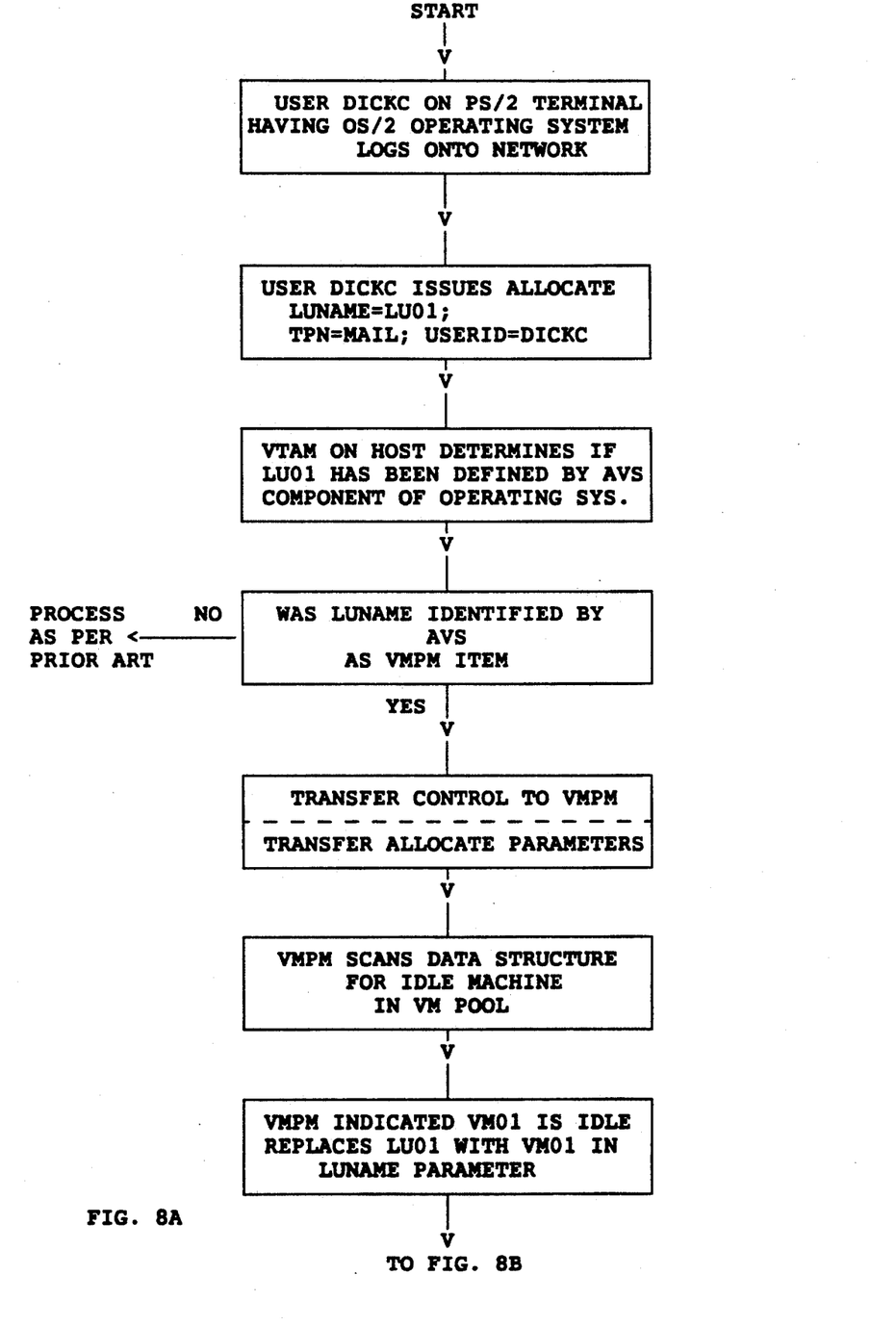
FIGS. 8A and 8B are a flow chart setting forth the steps involved by the Pool Manager in executing a distributed application program in accordance with the new method.
Figure 8B:
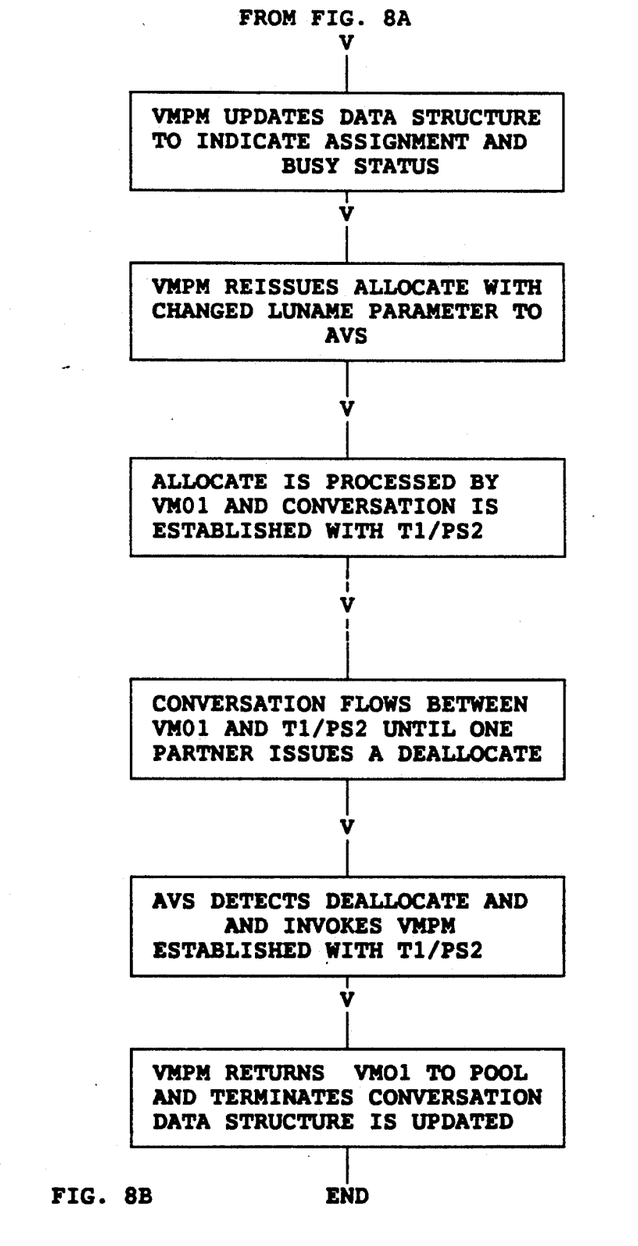

FIGS. 8A and 8B Bet forth a flow chart of the steps involved in the program to program communication process described above for distributed application programs.

The term "distributed application program" hall been used in the above description with reference to a pair of programs that have been coded to communicate with each other using APPC verbs. One program executes on a terminal while the other executes on the host. The program that issues the first Allocate verb to initiate a conversation request is sometimes referred to as Part A of the distributed application program while the program addressed in the request has been referred to as Part B of the distributed application program. The term "transaction program" has been used with reference to either Part A or Part B of a distributed application program.

While the invention has been shown and described with reference to the preferred embodiment, it should be understood by those persons skilled in the art that changes and modifications may be made without departing from the spirit of the invention or the scope of the appended claims.

We claim:

1. A method to conserve system resources during execution of a Distributed Application Program (DAP) in an SNA network having a host processor and a plurality of terminals in which information is transferred in accordance with LU 6.2 protocols between one said terminal and said host by concurrent execution of respective parts of said DAP respectively at said one terminal and at said host processor, said host processor having a virtual machine type Operating System including a programming module to automatically setup a plurality of virtual machines each with a predefined name during the starting up of said host processor, said method comprising the following steps, A) creating with said host processor a pool of unassigned idle virtual machines at said host processor, including the further steps of;
 1) providing a data structure for use by said module in the creation and management of said virtual machines in said pool, including the further step of,
    (a) defining a control block having a plurality of fields, in said data structure for each said virtual machine that is automatically created including the steps of,
       (i) designating one said field for storing said name assigned to said virtual machine, and
       (ii) designating a second field for indicating the current status of said virtual machine.
 2) storing in said data structure a plurality of names for the virtual machines to be created by said programming module, and
 3) automatically creating each said virtual machine for said pool during said starting up with said programming module, including referencing said data structure for said names to be assigned to said virtual machines,
B) transmitting to said host processor an LU 6.2 "Allocate" verb from said one terminal during execution of one part of a DAP stored at said terminal requesting a conversation with another part of said DAP stored at said host processor,
C) assigning one of said idle virtual machines in said pool to process said conversation between respective said parts of said DAP, and
D) returning said virtual machine to said pool at the end of said conversation.

2. The method set forth in claim 1 in which said step of automatically creating includes the further step of:
A) setting an indicator in said status field to indicate an IDLE status during said step of automatically creating.

3. The method recited in claim 2 including the further step of,
A) issuing a first request from said terminal to said host for an LU 6.2 conversation between said parts of said DAP, said first request including a USERID, an identification of said DAP, and an identification of the LU 6.2 Logical Unit to process said request.

4. The method set forth in claim 3 including the further step of
A) determining at said host processor if said first request is to be assigned to an idle virtual machine in said pool manager including the step of,
 (1) referencing said Logical Unit identification.

5. The method Bet forth in claim 4 including the further step of,
a) assigning one idle virtual machine to process said request in response to said step of determining,
b) initiating a conversation between said parts of said DAP in response to an LU 6.2 "ALLOCATE" verb being received by said virtual machine assigned in step a),
c) terminating said conversation in response to the first LU 6.2 "DEALLOCATE" verb received by said assigned virtual machine, and
d) returing said assigned virtual machine to said pool with an idle status at the end of said step of terminating.

* * * * *